US00RE36048E

United States Patent [19]

Schmolz et al.

[11] E Patent Number: Re. 36,048

[45] Reissued Date of Patent: Jan. 19, 1999

[54] EYEGLASSES HAVING A DETACHABLE NOSE REST

[75] Inventors: Ingeborg Schmolz, Munich; Rolf Winkler, Eisingen, both of Germany

[73] Assignee: Frey & Winkler GmbH & Co. KG, Koenigsbach, Germany

[21] Appl. No.: 315,140

[22] Filed: Sep. 29, 1994

Related U.S. Patent Documents

Reissue of:

[64] Patent No.: 5,200,771
Issued: Apr. 6, 1993
Appl. No.: 687,485
Filed: Apr. 19, 1991

[30] Foreign Application Priority Data

Apr. 19, 1990 [DE] Germany ..... 90044681 U

[51] Int. Cl.[6] ..... G02C 5/02

[52] U.S. Cl. ..... 351/132; 351/124; 351/125

[58] Field of Search ..... 351/124, 125, 351/132, 87, 64, 65, 67, 227, 41, 128, 131, 139

[56] References Cited

U.S. PATENT DOCUMENTS

| | | | |
|---|---|---|---|
| 1,789,937 | 1/1931 | Curran | 351/132 |
| 2,596,572 | 5/1952 | Lindbolm . | |
| 3,758,203 | 9/1973 | Lipchik et al. | 351/132 |
| 4,190,333 | 2/1980 | Lambert | 351/95 |
| 4,787,729 | 11/1988 | Ruffen | 351/137 |

FOREIGN PATENT DOCUMENTS

| | | |
|---|---|---|
| 0191887 | 3/1987 | European Pat. Off. . |
| 1115206 | 11/1954 | France . |
| 1432641 | 2/1966 | France . |
| 2151656 | 4/1973 | France . |
| 2164074 | 7/1973 | France . |
| 2428857 | 1/1980 | France . |
| 1683390 | 9/1954 | Germany . |
| 1916118 | 5/1965 | Germany . |
| 0280566 | 8/1988 | Germany . |
| 8804232 | 8/1988 | Germany . |
| 9004468.1 | 8/1990 | Germany . |
| 750551 | 4/1954 | United Kingdom . |

*Primary Examiner*—Hung X. Dang
*Attorney, Agent, or Firm*—Pillsbury Madison & Sutro LLP

[57] ABSTRACT

In a pair of eyeglasses having a bridge joining the edges of the lenses, the nose rest includes a one-piece bow which is secured via a spacer element to a retaining and essentially rests only on the bridge of the nose. In particular, the bow, spacer element and retaining plate are portions of a one-piece shaped part, so that a wider range of adaptation options to the individual anatomical features of the eyeglasses wearer in the nose region, on the one hand, and to the eyeglasses design used, on the other hand, is possible in a simple manner.

13 Claims, 3 Drawing Sheets

EYEGLASSES HAVING A DETACHABLE NOSE REST

Matter enclosed in heavy brackets [ ] appears in the original patent but forms no part of this reissue specification; matter printed in italics indicates the additions made by reissue.

BACKGROUND OF THE INVENTION

The present invention relates to a pair of eyeglasses of the type having a bridge joining the edges of the lenses and a nose rest that can be mounted on the side of the bridge facing toward the wearer.

Proper positioning of a glasses frame is of critical importance because this defines the path of incident light into the eyes, and hence the intended optical effect, while an anatomically unfavorable or unskilled positioning can cause impairments and in particular discomfort to the wearer and damage to the skin where the glasses rest.

These two problem areas are intrinsically interrelated, and the actual problem arises from the fact that the relevant anatomical features in the head region, that is the region of the root and sides of he nose and in region around the ears, are different in every person and also differ from one another in persons of different races.

It suffices to mention here only the variation in the width of the forehead by up to 10 mm, the shape and width of the nose, and so forth. The anatomical features which are particularly relevant in the design of a glasses frame can be found in an article by Dieter Fahrner published in NOJ 11/1990, pp. 8 to 19.

If it is to be possible to position the eyeglasses frame on any individual wearer in a satisfactory way from both an optical and an anatomical standpoint, structural designs are necessary that can be adapted in some way sufficiently so that the optical wearing situation for a given wearer is attainable at least in rough approximation. In principle this adaptation can be attained in two different ways: namely by means of a structural part that is intrinsically variable in shape, or one that is available in different sizes and dimensions. It is then the task of the optician, for an industrially manufactured glasses frame, to make such changes with skill or to select properly fitting component parts, to enable individual adaptation to the wearer. For instance, manufacturers offer glasses frames in three different bridge widths (16 mm, 18 mm and 20 mm), to make possible at least a rough adaptation to the width of the bridge of the nose of the particular wearer.

In narrowly defined regions, adaptations to the anatomical features of the wearer can also be attained by means of a soft or elastic embodiment, as is for instance known from the use of silicone as a sheathing material, which has the additional advantage of great comfort while being worn.

SUMMARY OF THE INVENTION

An object of the present invention is to provide eyeglasses which eliminate a number of the complicating factors characteristic of the prior art.

A more specific object of the invention is to provide a novel nose rest which is easy to attach, comes in a single size, is reliably adaptable to individual anatomical features, and also is highly comfortable when worn.

The above and other objects are achieved, in a pair of eyeglasses, having lenses, a bridge connected between edges of the lenses and a nose rest that can be mounted on the side of the bridge facing toward the wearer, by the improvement wherein the nose rest comprises: a one-piece bow; retaining means secured to the bridge; and a spacer element securing the bow to the retaining means; wherein the bow has substantially the shape of a circular arc and is positioned and configured to rest essentially only on the bridge of the nose of a wearer.

The basic concept of the invention is that with the bow resting essentially only on the bridge of the nose [optimal basic adaptation is assured, since in the case of] optimal basic adaptation is assured, since in the case of Europeans, and more generally Caucasians, the bridge of the nose extends at an angle of approximately 45° to the primary direction of view and thus can be considered as largely constant, within narrow tolerances. The selection of the bridge of the nose as a constant for orientation of the nose rest is thus a first important step toward attaining the stated objects, since all of the other parameters, which are subject to greater fluctuations, such as the width of the nose and the shape and the size of the nose, are excluded from the outset, and individual adaptation of the shape of the nose rest need be done only within narrow limits and is easily attainable by suitable deformation of the nose rest itself The spacer element, moreover, assures that the glasses frames do not fit too close to the face of the wearer and do rest on their eyebrows and cheeks, thus reliably avoiding these undesirable contacts with the skin and soiling of the glasses and lenses from skin oils or sweat in the region of the eyebrows Other essential advantages of the embodiment of the nose rest according to the invention reside in the extremely compact, inconspicuous attachment to the glasses frame, so that there are no esthetic impairments whatever in the appearance of the glasses. Suitable threaded tangs can be attached to or installed in any pair of glasses, whether with a metal or a plastic frame; these tangs pass through recesses in the retaining plate, and the nose rest can easily be secured to the glasses frame through them.

According to an advantageous embodiment of the invention, the bow, spacer element and retaining plate are constituted by a one-piece shaped part, particularly made of stainless steel.

The results thus are both that the bow is deformable and that the distance and angle of rest can be adjusted by suitable relative positioning or bending of the center portion relative to the two end portions that form the bow and retaining plate. By varying the bending angle between the retaining plate and the bow, for instance, easy adaptation is possible to a steeper nose bridge, such as is often required Asiatic people, for instance.

According to a further embodiment, the bow has openings through which the material of a silicon sheath can pass. By suitable dimensioning of these openings, the cross section of the material of the bow in the region on either side of the openings can be selected in such a way that shaping of the bow, which is preformed in an approximately circular arc, is easily possible, so that a possibly necessary fine adaptation of the surface of the rest to the shape of the bridge of the nose of the wearer may also be performed without difficulty; it is thus assured in particular that the sides of the nose are relieved of the weight of the glasses which, particularly with heavy glasses frames, is important in order to avoid hindrance to and impairment of breathing Furthermore, the use of a one-piece shaped part permits simple manufacture, since this shaped part may be embodied as a stamped part.

According to a further preferred embodiment, the retaining plate is secured to the bridge by means of pins, which are for instance threaded pins soldered to the metal bridge, and spacer rings are slipped over these pins between the bridge and the retaining plate. This makes a further range of variation possible in a simple manner by way of adjusting the distance of the glasses from the face of the wearer; the spacer rings may for instance be of plastic, but they may also be of metal and/or be adapted in color and material to the remainder of the glasses frame Such spacer rings may for instance be 1 mm to 2 mm thick.

Other advantageous embodiments will be described below.

Two exemplary embodiments of glasses according to the invention will now be described in further detail with reference to the drawings.

DESCRIPTION OF THE PREFERRED EMBODIMENTS

Figure 1:
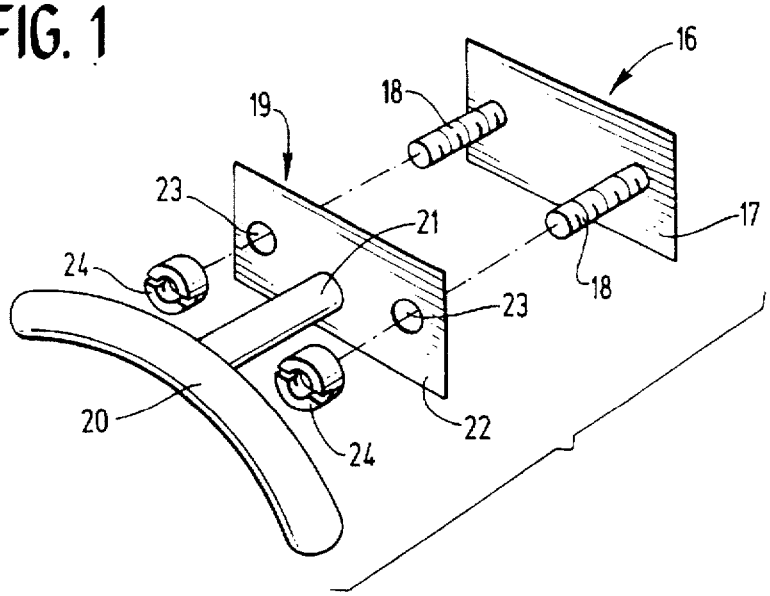
FIG. 1 is an exploded perspective basic view of a first exemplary embodiment of a nose rest according to the present invention.
Figure 2:
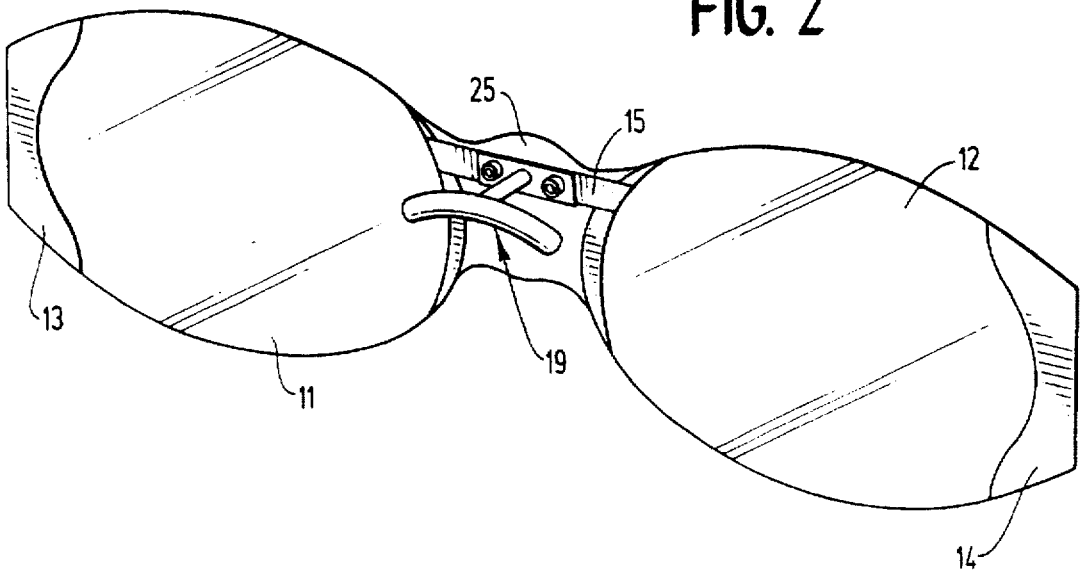
FIG. 2 is a rear pictorial view of the nose rest of FIG. 1, when mounted on a pair of glasses.
Figure 6:
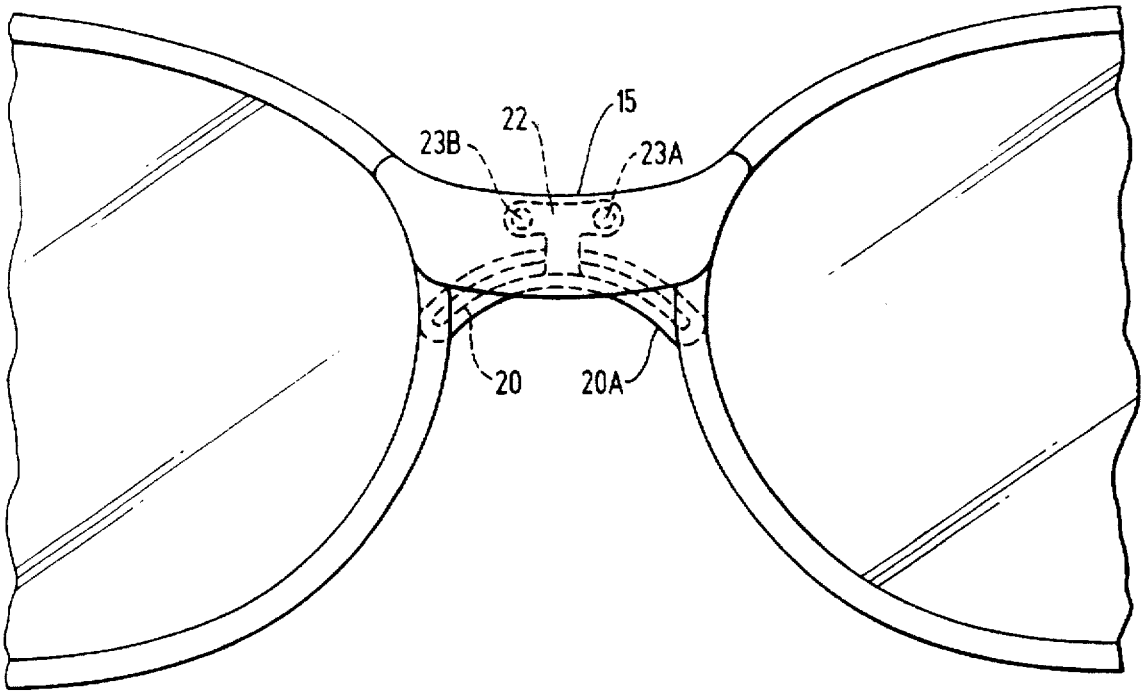
FIG. 6 is a front pictorial view of a pair of glasses with a nose rest in accordance with the second exemplary embodiment of FIGS. 3–5.

In the first exemplary embodiment shown in FIGS. 1 and 2, the nose rest 19 is associated with a pair of eyeglasses having lenses 11 and 12, side frame members 13 and 14, a central frame member 25 and a bridge 15. The eyeglasses may also have a one-piece frame in which members 13, 14 and 25, and possibly also bridge 15 are integral with one another, as depicted in FIG. 6. Nose rest 19 is composed of three parts; a retaining plate 22 with bores 23 for receiving threaded pins for attachment to the pair or glasses, a spacer element 21, preferable having a length of at least 3 mm and bow 20 to rest on the bridge of the wearer's nose.

A nose rest of this kind can be mounted either via a separate retaining element 16 having threaded pins 18 and secured to the bridge 15 of glasses 10, or directly via threaded pins that protrude from the back of the bridge 15 of the eyeglasses' frame and are mounted in, or let or injected into it. In either case, nose rest 19 will be secured to pins 18 via lock nuts 24.

In the second exemplary embodiment, shown in FIGS. 3 to 7, the functions of bow 20, spacer element 21 and retaining plate 22 are taken over by a one-piece stainless steel shaped part 10 having a first end portion 10A which forms the bow 20, a second end portion 10B which forms the retaining plate 22, and a tapered center portion 10C which acts as a spacer element 21. This shaped part 10 can be bent from a stamped metal, e.g. stainless steel, plate in accordance with the cross-sectional view of FIG. 5, so that with adaptation to the shape and positioning of the bridge of the glasses, the planes of the two end portions 10A, 10B form, with respect to the plane FIG. 5, an angle $\alpha$ or 60° to 90° preferable 60° to 70°, for example Advantageously, the stainless steel shaped part has a thickness of 0.4 to 0.8 mm.

The bow 20, or the end portion 10A forming this bow 20, is sheathed with a soft plastic material, such as silicone, 20A and has openings 20B and 20C for better fixation of this plastic material. The Shore A hardness of the silicone material is in the range from 30 to 60.

Figure 3:
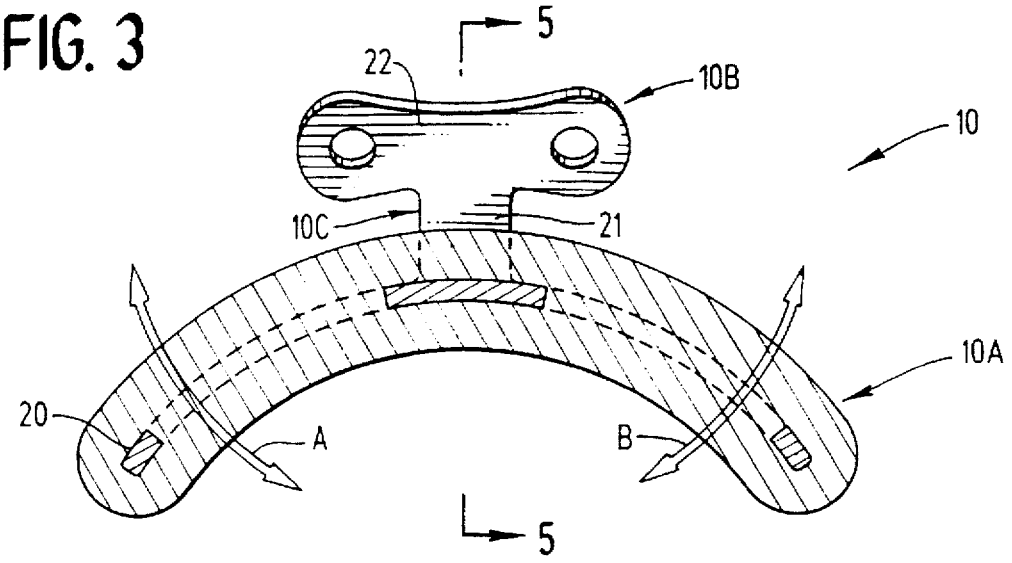
FIG. 3 is a cross-sectional view in the plane C-D of FIG. 4 of a second exemplary embodiment of a nose rest according to the present invention.
Figure 4:
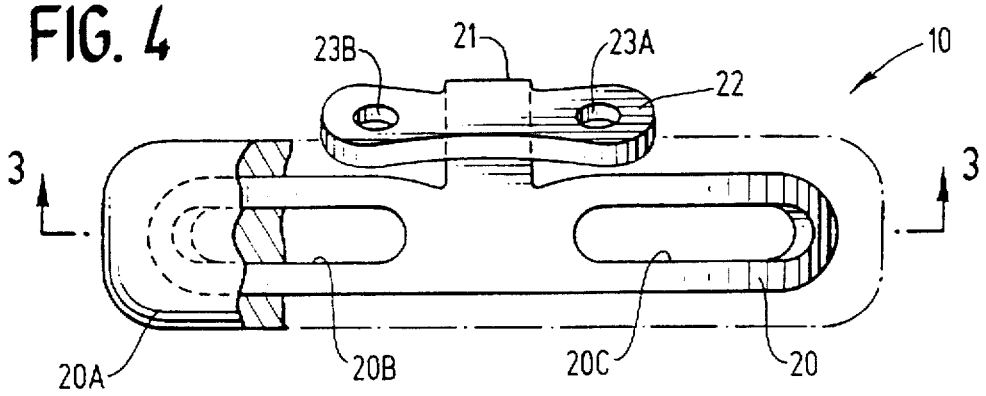
FIG. 4 is a top plan view of the bow of the nose rest of FIG. 3.

The bow 20 in the exemplary embodiment shown is curved approximately in the form of a quarter-circle, and because of the openings 20B, 20C, a cross-sectional reduction of material is attained in the lateral flank region of the bow 20, which enables easy bending of the bow open or closed in the directions of the double arrows A and B, as shown in FIG. 3, and thus an adaptation to the shape of the bridge of the individual wearer's nose.

Figure 5:
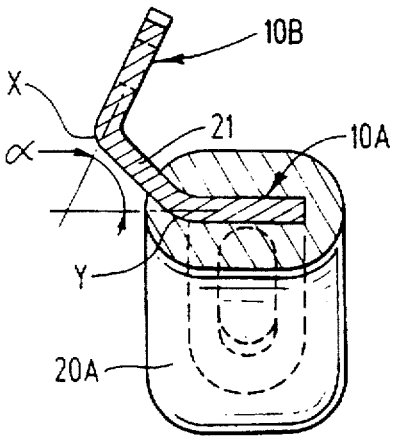
FIG. 5 is a cross-sectional view in the plane A-B of FIG. 3.

From the sectional view of FIG. 5 it can easily be seen that the angle $\alpha$ between the planes of the two end portions 10A and 10B can be varied quite easily by variable bending at the transitional regions X and Y between center portion 21 and end portions 20 and 22, thus enabling an adaptation of the plane of the nose rest to the plane of the bridge of the particular glasses frame used. By a suitable combination of the angles of bending at the bending points X and Y, an adjustment of the spacing of the surface of the rest, defined by portion 20, relative to the plane of retaining plate 22 can also be attained to a certain extent Changes in the spacing, changes in the angle $\alpha$, and changes in the shaping of bow 20 are thus possible by simple processes of bending and deformation, which can be performed quickly and with high precision.

Figure 7:
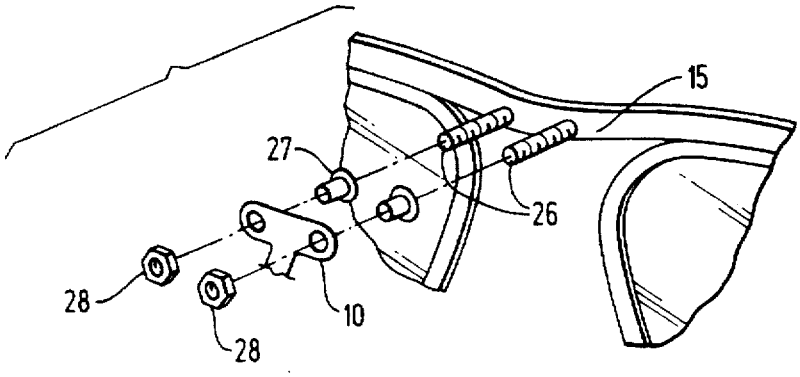
FIG. 7 is a perspective exploded view or the mounting of a nose rest according to the invention on a pair or glasses.

An example for mounting of the nose rest is finally sketched in the example shown in FIG. 7. Two threaded pins 26 are fastened to bridge 15. If bridge 15 is of metal, this can be achieved by soldering; if bridge 15 is of plastic, pins 26 may be in the form of suitable threaded anchors cast integrally with it. Nose rest 10 can be slipped onto pins 26 and secured with nuts 28. If the aforementioned range of variation in the adjustment of spacing of the bridge 15 from the region where it rests on the bridge of the nose is not adequate, than two spacer rings or tubes 27 may be inserted onto pins 26 between bridge 15 and shaped part 10, and this adaptation can in turn be augmented in the simplest possible fashion.

This applications relates to subject matter disclosed in German Application No. G 9004 468.1, filed Apr. 19, 1990, the disclosure of which is incorporated herein by reference.

While the description above refers to particular embodiments of the present invention, it will be understood that many modifications may be made without departing from the spirit thereof The accompanying claims are intended to cover such modifications as would fall within the true scope and spirit of the present invention.

The presently disclosed embodiments are therefore to be considered in all respects as illustrative and not restriction, the scope of the invention being indicated by the appended claims, rather than the foregoing description, and all changes which come within the meaning and range of equivalency of the claims are therefore intended to be embraced therein.

What is claimed is:

1. In a pair of eyeglasses, having lenses, a bridge connected between edges of the lenses and a nose rest that can be mounted on the side of the [bridges] *bridge* facing toward the wearer, the improvement wherein: said nose rest comprises a one-piece bow; a [resting] *retaining* plate having two bores, and a spacer element securing said bow to said retaining plate, mid bow, said retaining plate and said spacer element constituting respective portions of a one-piece shaped structure; said bow has substantially the shape of a circular arc and is positioned and configured to rest essentially only on the [bride] *bridge* of the nose of a wearer; and said eyeglasses further comprises two externally threaded screw elements secured to said bridge and passing through said bores of said retaining plate and two threaded nuts fastened to said screw elements for securing said retaining plate to said bridges.

2. The pair of eyeglasses of claim 1 wherein: said retaining plate is a flat retaining plate lying in a first plane; said bow is a plate which is flat in a second plane transverse to the direction in which it has the shape of a circular arc; and said first and second planes form an angle $\alpha$[$\pi$] *of* approximately 60° to 90° with one another.

3. The pair of eyeglasses of claim 2 wherein the angle $\alpha$ is formed by two bends of said spacer element each at a location adjacent a respective one of said retaining plate and said plate constituting said bow.

4. The pair of eyeglasses of claim 1 wherein said shaped structure is formed from a plate of stainless steel having a thickness of 0.4 to 0.8 mm.

5. The pair of eyeglasses of claim 1 further comprising spacer rings disposed on said [said] screw elements between said bridge and said retaining plate.

6. The pair of eyeglasses of claim 1 further comprising a holder piece carrying said screw elements and secured to said bridge.

7. The pair of eyeglasses of claim 1 wherein said screw elements are mounted directly on said bridge.

8. The pair of eyeglasses of claim 7 wherein said bridge is made of metal and said screw elements are soldered to said bridge.

9. The pair of eyeglasses of claim 7 wherein said bridge is made of plastic and said screw elements are threaded anchors that are inserted into said bridge.

10. The pair of eyeglasses of claim 1, wherein the length of said spacer element is at least 3 mm.

11. The pair of eyeglasses of claim 1 further comprising a soft sheath of plastic encasing said bow.

12. The pair of eyeglasses of claim 11 wherein said bow has openings for the passage therethrough of material of said sheath.

*13. In a pair of eyeglasses, having lenses, a bridge connected between edges of the lenses and a nose rest that can be mounted on the side of the bridge facing toward the wearer, the improvement wherein: said nose rest comprises a one-piece bow; a retaining plate having at least one bore, and a spacer element securing said bow to said retaining plate, said bow, said retaining plate and said spacer element constituting respective portions of a one-piece shaped structure; said bow has substantially the shape of a circular arc and is positioned and configured to rest essentially only on the bridge of the nose of a wearer; and said eyeglasses further comprise means including at least one externally threaded screw element and at least one threaded passage in which said screw element is engageable, said means being mounted for securing said retaining plate to said bridge.*

* * * * *